United States Patent
Aosima et al.

(10) Patent No.: US 8,814,213 B2
(45) Date of Patent: Aug. 26, 2014

(54) FASTENER FOR SHIELD PLATE

(75) Inventors: Yuuki Aosima, Toyohashi (JP); Kohei Shigematsu, Toyota (JP)

(73) Assignees: Newfrey LLC, Newark, DE (US); Toyota Jidosha Kabushiki Kaisha, Toyota-Shi (JP)

( * ) Notice: Subject to any disclaimer, the term of this patent is extended or adjusted under 35 U.S.C. 154(b) by 320 days.

(21) Appl. No.: 13/278,781

(22) Filed: Oct. 21, 2011

(65) Prior Publication Data

US 2012/0132769 A1 May 31, 2012

(30) Foreign Application Priority Data

Nov. 30, 2010 (JP) .................................. 2010-266342

(51) Int. Cl.
*B62D 25/18* (2006.01)

(52) U.S. Cl.
USPC .................... 280/848; 248/224.8; 248/231.71; 16/267

(58) Field of Classification Search
CPC ....................................................... B65D 25/18
USPC .............. 248/224.8, 316.4, 231.71; 280/830, 280/848, 849; 296/187.03; 16/267
See application file for complete search history.

(56) References Cited

U.S. PATENT DOCUMENTS

| | | | | |
|---|---|---|---|---|
| 2,557,146 A | * | 6/1951 | Schatzman | 280/848 |
| 2,557,147 A | * | 6/1951 | Schatzman | 280/848 |
| 4,264,083 A | * | 4/1981 | Matthew et al. | 280/851 |
| 4,354,566 A | * | 10/1982 | Yuda | 180/68.6 |
| 4,413,856 A | * | 11/1983 | McMahan et al. | 296/187.03 |
| 5,141,282 A | * | 8/1992 | Fujiwara | 296/193.1 |
| 2002/0005464 A1 | * | 1/2002 | Miura | 248/231.9 |

FOREIGN PATENT DOCUMENTS

| | | |
|---|---|---|
| JP | 2005-186809 | 7/2005 |
| JP | 2007-090999 | 4/2007 |
| JP | 2010-089622 | 4/2010 |
| JP | 2010-115985 | 5/2010 |

* cited by examiner

*Primary Examiner* — Anita M King

(74) *Attorney, Agent, or Firm* — Harness, Dickey & Pierce, P.L.C.

(57) ABSTRACT

A clip for mounting to a vehicle a shield plate arranged on the inside of a fender panel. The clip can be adapted to different vehicle models by changing the shield plate used with the clip. The clip comprises a shield plate insertion slot for inserting a shield plate, and two leg portions mounted in two mounting holes in a body panel. When the leg portions are inserted into the mounting holes in the body panel, conical portions on the leg portions guide the clip to the mounting position. To mount a fender shield plate, the clip has a shield plate engagement prong for engaging an engagement hole in the shield plate, and a shield plate releasing piece for releasing the shield plate engagement prong. The clip has a multi-step engagement prong for engaging the mounting holes in the body panel, and a clip releasing piece for releasing the engagement.

7 Claims, 6 Drawing Sheets

FASTENER FOR SHIELD PLATE

CROSS-REFERENCE TO RELATED APPLICATIONS

The present application claims priority to Japanese Patent Application No. 2010-266342, filed Nov. 30, 2010. The entire contents of this priority application are incorporated herein by reference.

BACKGROUND OF INVENTION

The present invention relates to a clip for mounting a shield plate arranged on the inside of a fender panel for a vehicle.

Usually, in a fender for a vehicle such as a passenger vehicle, the fender panel is fixed to a fender apron. A long space extending in the longitudinal direction of the vehicle exists between the fender panel and the fender apron. A fender shield plate is arranged in this space to block heat and noise. The structure of a fender and its environs for a vehicle such as a passenger vehicle are described in Japanese Patent Application No. 2010-115989 and Japanese Patent Application No. 2007-90999.

A fender shield plate of the prior art is arranged vertically with respect to the fender panel on the inside of the fender panel, and the space is divided in the longitudinal direction of the vehicle.

Japanese Patent Application No. 2010-115989 discloses a seal component having a base plate mounted on the fender apron to the inside of the fender panel so that the plate surface is vertical with respect to the longitudinal direction of the vehicle, and a sponge portion is mounted with the base plate interposed by both surfaces.

The seal component in Japanese Patent Application No. 2010-115989 can be adapted to the different shapes on the inside of the fender panels of different vehicle models not by changing the shape of the base plate but by changing the shape of the sponge component.

However, dedicated fixing holes are required to fix the fixing portion of the base plate to the fixing holes in the fender apron. Also, because it is mounted on the fender apron using a single fixing portion, the fixing portion is more likely to rattle.

Japanese Patent Application No. 2007-90999 discloses a mounting structure for an insulator in which a breakable portion is installed in a mounting means used to mount an insulator (shield plate) to a body panel in order to block the flow of air through a space to the inside of a fender panel. When an excessive impact force is applied due to a collision, the breakable portion breaks and absorbs the impact force. The mounting structure for an insulator in Japanese Patent Application No. 2007-90999 has to have dedicated mounting holes for mounting the mounting means to the body panel.

Also, different insulators have to be used on different vehicle models.

Therefore, a clip for fastening a fender shield plate is desired in which the fender shield plate can be mounted using existing holes.

Also, a fender shield plate is desired that can be adapted to different vehicle models using the same clip when a fender is mounted on the inside of a fender panel.

Further, a clip for fastening a fender shield plate is desired in which there is very little rattling in any direction after the fender shield plate has been mounted.

SUMMARY OF THE INVENTION

Therefore, an object of the present invention is to provide a clip for fastening a fender shield plate allowing a fender shield plate to be mounted using existing holes.

Another object of the present invention is to provide a clip for fastening a fender shield plate that can be adapted to different vehicle models by changing the shield plate used with the same clip when mounting a fender to the inside of a body panel such as a fender apron.

Another object of the present invention is to provide a clip for fastening a fender shield plate in which there is very little rattling in any direction after the fender shield plate has been mounted.

Another object of the present invention is to provide a clip for fastening a fender shield plate in which at least one of the three mentioned above is solved.

In order to achieve these objects, the invention in a first aspect is a clip for fastening a fender shield plate used to mount a fender shield plate on a body panel, wherein the clip comprises a shield plate insertion slot for inserting a shield plate, and a pair of leg portions mounted in two mounting holes in a body panel, wherein a distance between the pair of leg portions becomes smaller as a base portion of the leg portions is approached, and wherein each one of the leg portions is inserted into and mounted in one of the mounting holes in the body panel.

In this way, a fender shield plate can be mounted using existing holes such as round welding holes. Because two holes are used, the clip is not mounted when the holes are of a different size or the distance between holes is different. As a result, the clip is not mounted in the wrong holes.

Here, the same clip can be adapted to different vehicle models by changing the fender shield plate.

Preferably, the clip has a shield plate engagement prong for engaging an engagement hole in the fender shield plate, and a shield plate releasing piece for disengaging the shield plate engagement prong, thereby disengaging the shield plate engagement prong, and releasing the fender shield plate.

In this way, the fender shield plate can be easily released as a unit.

Preferably, both ends of the shield plate mounting surface on the side with the shield plate insertion slot have raised shield plate rattle-suppressing ribs.

In this way, rattling can be suppressed in the longitudinal direction of the vehicle.

Preferably, the fender shield plate has two slits, and both ends of the shield plate insertion slot have shield plate insertion ribs able to be inserted into the slits in the fender shield plate.

In this way, rattling can be suppressed in the vertical direction of the vehicle.

Preferably, the leg portions have two multi-step engagement prongs for engaging the inner periphery of the two mounting holes in the body panel, and two clip releasing pieces adjacent to the multi-step engagement prongs for releasing the prongs from the body panel, thereby disengaging the multi-step engagement prongs from the mounting holes in the body panel, and releasing the clip for fastening a fender shield plate.

In this way, the clip for fastening a fender shield plate can be easily released.

Preferably, the base portions of the leg portions have a protruding corner-filling rib, and the corner-filling ribs engage the edge of the mounting holes when the leg portions are inserted into the mounting holes in the body panel.

In this way, the clip for fastening a fender shield plate can be secured so that it is difficult to pull out.

Preferably, the clip has a rattle-preventing elastic piece, and the end portion of the elastic piece curves downward from the base portion so as to press against a surface of the body panel.

In this way, rattling can be suppressed in the longitudinal direction of the vehicle between the fender shield plate and the clip for fastening a fender shield plate.

Preferably, the clip has a rattle-preventing rigid rib surrounding the rattle-preventing elastic piece.

In this way, rattling of the clip for fastening a fender shield plate can be minimized.

The present invention provides a clip for fastening a fender shield plate that is able to mount a fender shield plate using existing welding holes.

Also, the present invention provides a clip for fastening a fender shield plate that can be adapted to different vehicle models using the same clip when a fender shield plate is mounted to the inside of a fender apron.

Also, the clip minimizes rattling in any direction after the fender shield plate has been mounted.

Also, the fender shield plate can be easily released as a unit after being mounted on a vehicle, or the clip can be easily released.

BRIEF DESCRIPTION OF THE DRAWINGS

FIG. 7b is an enlarged cross-sectional view of the portion indicated by C in FIG. 7a.

DETAILED DESCRIPTION OF THE PREFERRED EMBODIMENTS

The following is an explanation with reference to the drawings of a clip for fastening a fender shield plate in an embodiment of the present invention.

Figure 1:
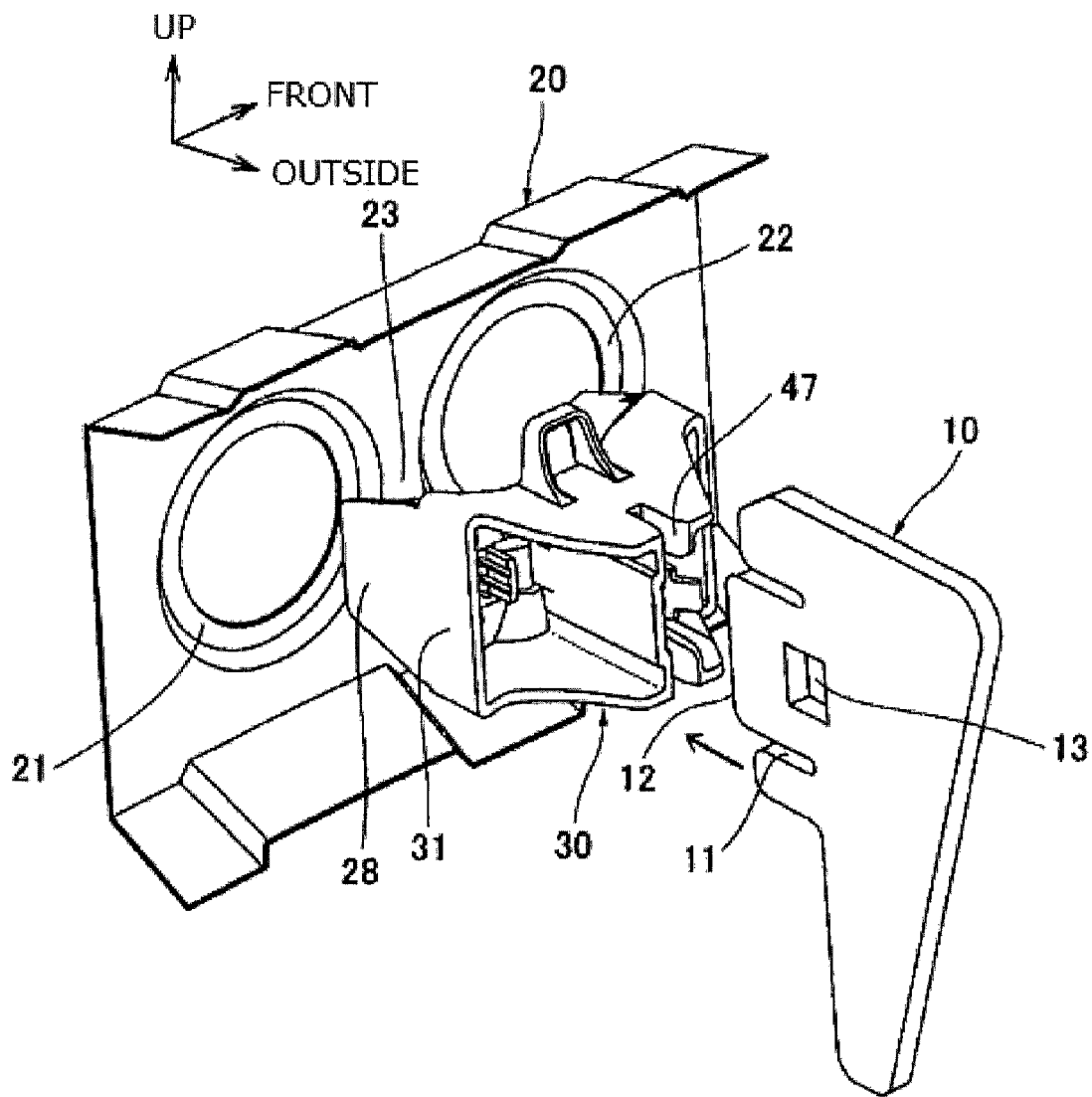
FIG. 1 is a perspective view showing the situation prior to a fender shield plate being mounted on a body panel using a clip according to an embodiment of the present invention.
Figure 2:
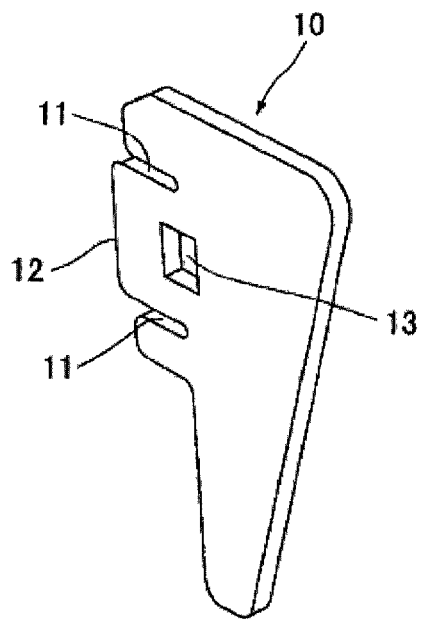
FIG. 2 is a perspective view of the fender shield plate.
Figure 3:
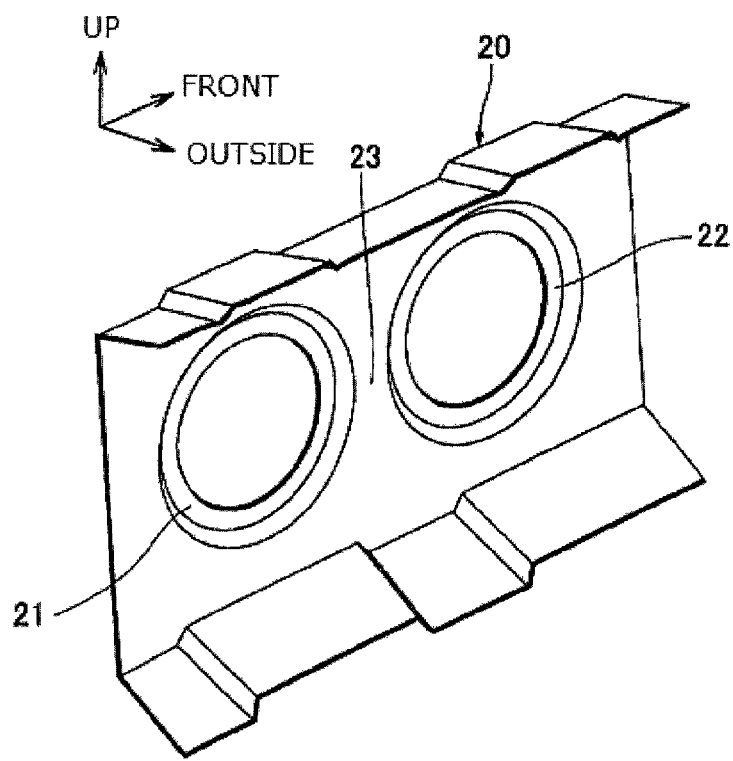
FIG. 3 is a perspective view of the body panel.

FIG. 1 is a perspective view showing the situation prior to a fender shield plate (referred to below simply as the "shield plate") 10 being mounted on a body panel 20 such as a fender panel using a clip for fastening a fender shield plate (referred to below simply as the "clip") 30 according to an embodiment of the present invention. In this figure, up, front and outside refer, respectively, to the upward direction, forward direction and outward direction relative to the vehicle. In FIG. 1 through FIG. 3, the upward direction, forward direction and outward direction relative to the vehicle are three axial directions that are perpendicular to each other.

The clip 30 in this embodiment is a single component. The shield plate 10 is inserted into and fixed to the shield plate insertion slot 47, and the two leg portions 28 can be fixed to two welding holes 21, 22 in the body panel 20.

The following is an explanation of the shield plate 10, the body panel 20 and the clip 30.

FIG. 2 is a perspective view of the shield plate 10. The shield plate 10 in the explanation of the embodiment has a substantially triangular shape. The shape of the shield plate 10 depends on the cross-sectional shape of the space surrounded by the fender panel and the fender apron. The shape of the space is usually a triangular shape surrounded by the fender apron in the horizontal direction and the vertical direction relative to the vehicle, and by the fender panel in the diagonal direction. In this situation, the shape of the fender plate 10 is also triangular.

A slot 11 is formed in two locations on one side of the shield plate 10. The central portion 12 between the slots 11 is formed so as to protrude slightly from the other portions of the side.

An engagement hole 13 having a rectangular cross-section for fixing the shield plate 10 is formed in the portion between the slits 11.

FIG. 3 is a perspective view of a body panel such as a fender panel to which the clip 30 is to be mounted. The body panel 20 is arranged substantially horizontal with respect to the longitudinal direction of the vehicle.

Welding holes 21, 22 are opened in the body panel 20 for welding work. Welding holes 21, 22 are usually round, and often occur in succession. In the embodiment of the present invention, the clip 30 is mounted in the two welding holes 21, 22. The pair of leg portions 28 on the clip 30 is inserted into the two welding holes 21, 22, and the portion 23 of the body panel 20 between the two welding holes 21, 22 is interposed on both sides and fixed.

Because the pair of leg portion 28 on the clip 30 is mounted in the two welding holes 21, 22, rattling of the clip 30 can be suppressed in the rotational direction. Because the clip is mounted in two welding holes 21, 22, the clip cannot be mounted in holes with a different interval between them or holes of a different diameter. This can prevent the mistaken mounting of the clip 30 in different holes.

Also, the positions of the welding holes 21, 22 are slightly different in the vertical direction. In FIG. 3, the welding hole 21 to the rear is lower than the welding hole 22 in the front. As a result, the clip 30 is mounted slightly lower on the rear side of the vehicle, and the shield plate 10 is also mounted on an incline with the front end positioned slightly to the rear. Similarly, the welding holes 21, 22 in the body panel 20 on the other side of the vehicle are arranged so that the welding hole to the rear is lower and so that the upper portion of the shield plate 10 is inclined slightly towards the rear of the vehicle.

When a shield plate 10 is mounted in the body panel 20 on both sides of the vehicle and a shield plate 10 is mounted using the same clip 30 on both the left and right body panels 20, the left and right shield plates 10 are inclined in the same way. Thus, the same clip 30 can be used on both the left and right sides.

Figure 4:
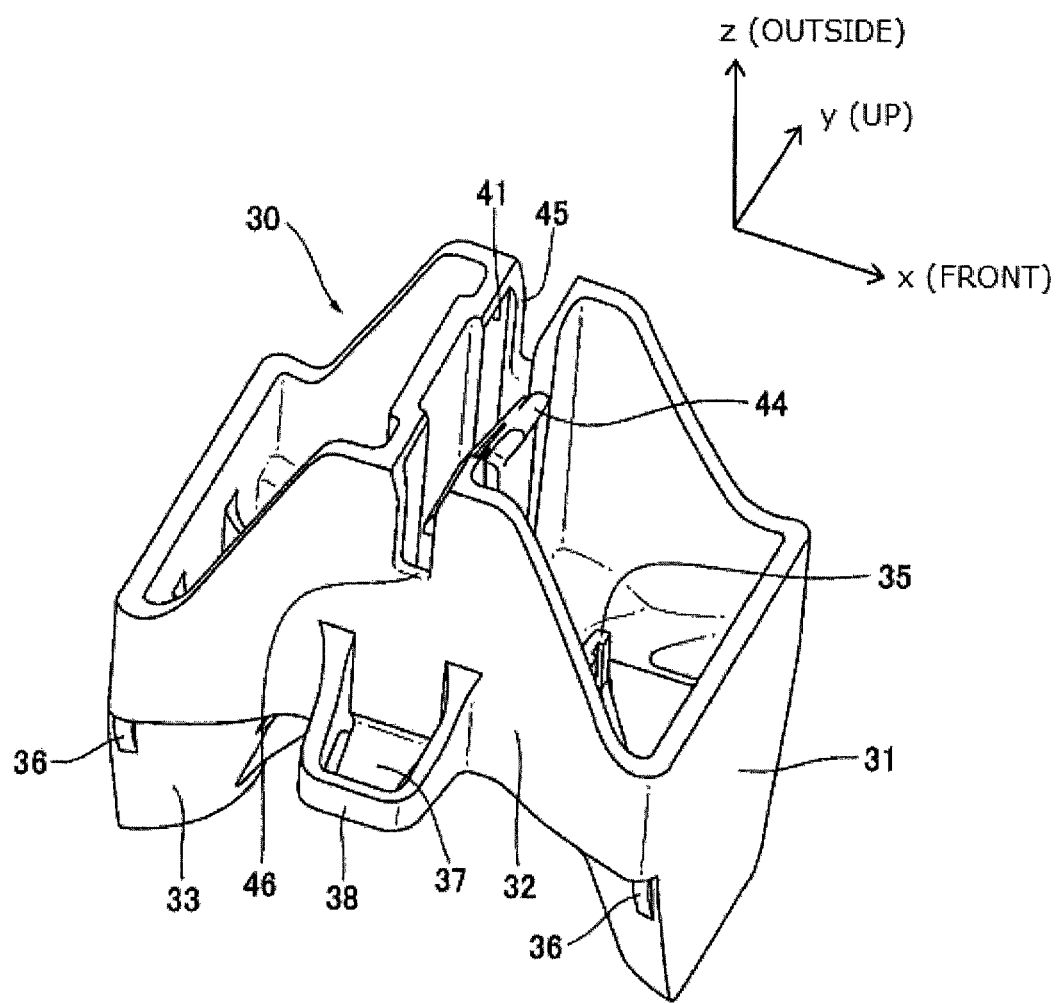
FIG. 4 is a perspective view of the clip in the embodiment of the present invention.
Figure 5:
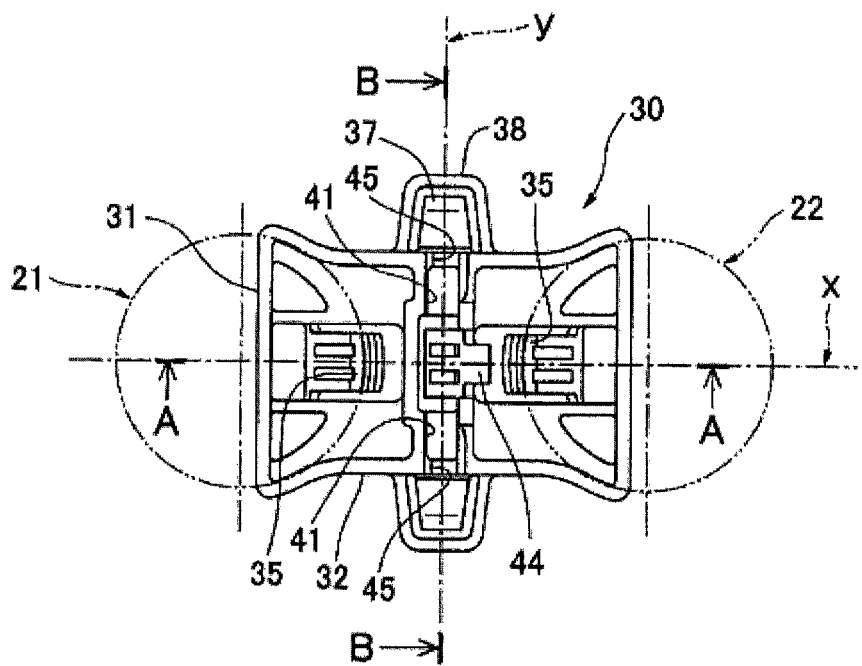
FIG. 5 is a top view of the clip shown in FIG. 4.
Figure 6:
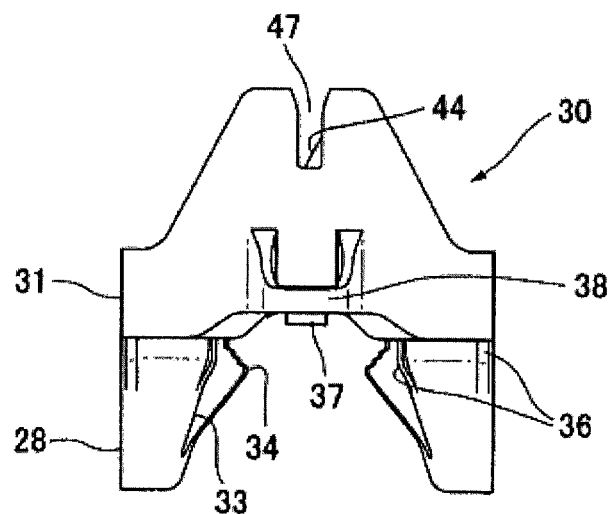
FIG. 6 is a front view of the clip shown in FIG. 4.
Figure 7A:
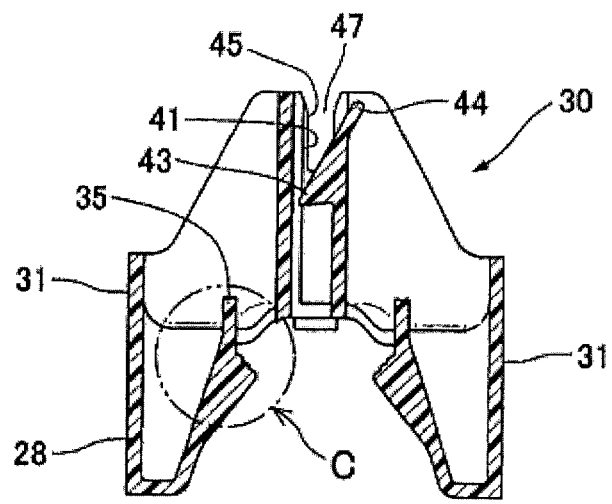
FIG. 7a is a cross-sectional view of the clip shown in FIG. 4 taken along line A-A in FIG. 5.
Figure 7B:
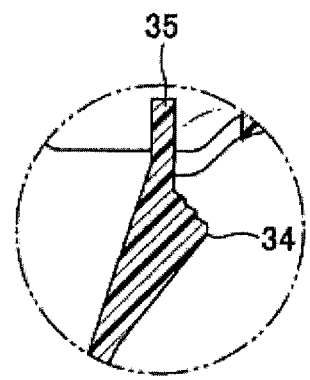
Figure 8:
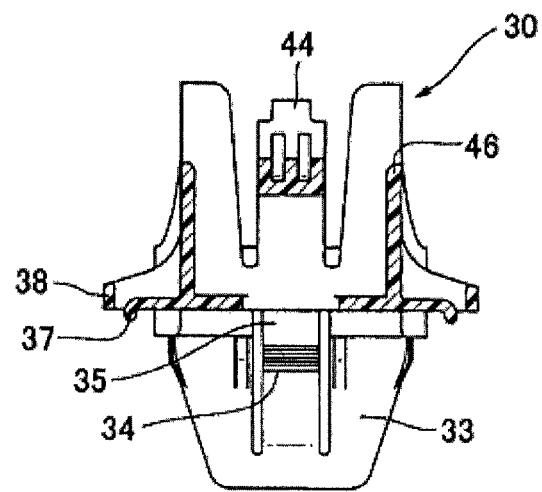
FIG. 8 is a cross-sectional view of the clip shown in FIG. 4 taken along line B-B in FIG. 5.

The following is an explanation of the clip 30 with reference to FIG. 4 through FIG. 8. FIG. 4 is a perspective view of the clip 30 as viewed from a different direction than FIG. 1. FIG. 5 is a top view of the clip 30, and FIG. 6 is a front view of the clip 30. FIG. 7a is a cross-sectional view of the clip 30 along line A-A in FIG. 5. FIG. 7b is an enlarged cross-sectional view of a multi-step engagement prong 34 in the portion indicated by C in FIG. 7a. FIG. 8 is a cross-sectional view of the clip 30 along line B-B in FIG. 5.

In order to simplify the explanation of the clip 30, the longitudinal direction, the vertical direction, and the outside direction of the vehicle are referred to, respectively, as the x-axis, y-axis, and z-axis directions in FIG. 4 through FIG. 8.

The clip 30 is a single component. As viewed from the top in FIG. 5, the clip 30 is substantially symmetrical along the x axis (clip center) passing through the center of the welding holes 21, 22. The clip is also substantially symmetrical along the y axis (shield plate mounting center) perpendicular to the clip center.

The end surface of the clip 30 in the x-axis direction is the outside surface 31. The other outside surface 32, which is the end surface in the y-axis direction adjacent to the outside surface 31, becomes closer to the outside surface as it moves from the portion near the outside surface 31 towards the central portion, and becomes substantially flat in the central portion.

The following is an explanation of the various components used to mount the shield plate 10 to the clip 30. As shown in FIG. 4 and FIG. 7a, a shield plate insertion slot 47 is formed in the central portion of the clip 30 in the x-axis direction. A shield plate mounting surface 41 extends along one side of the shield plate insertion slot 47. The shield plate mounting surface 41 is higher in the y-axis direction at both ends of the central portion than in the central portion so that the shield plate 10 comes into contact with shield plate mounting surface 41. Shield plate engagement prongs 43 are formed along the y-axis direction in the central portion of the surface opposing the shield plate mounting surface 41. The end portion of the shield plate engagement prongs 43 is adjacent to the opposing shield plate mounting surface 41. When the shield plate 10 is mounted in the clip 30, the end portion of a shield plate engagement prong 43 can enter an engagement hole 13 in the shield plate 10, and be fixed so that the shield plate 10 does not come off.

The tip of a shield plate engagement prong 43 in the z-axis direction has a shield plate releasing piece 44. When the shield plate releasing piece 44 is pushed open manually, the shield plate engagement prong 43 moves away from the shield plate mounting surface 41, the end portion of the shield plate engagement prong 43 moves out of the engagement hole 13 in the shield plate 10, and the shield plate 10 can be released from the clip 30.

As shown in perspective view in FIG. 4 and from the top in FIG. 5, a shield plate rattle-suppressing rib 45 raised with respect to the shield plate mounting surface 41 is formed at the end of the shield plate mounting surface 41 in the y-axis direction. By forcibly pressing the shield plate 10 into the rattle-suppressing rib 45, rattling can be suppressed between the shield plate 10 and the clip 30 in the x-axis direction (longitudinal direction of the vehicle).

The shield plate insertion slot 47 for inserting the shield plate 10 is formed adjacent to the shield plate mounting surface 41. As shown in perspective view in FIG. 4 and in cross-section in FIG. 8, a shield plate insertion rib 46 which is somewhat thicker than a slit 11 in the shield plate 10 is formed in the central portion of the outside surface 32 towards the inside with respect to the central portion of the outside surface 32 at the end portion of the shield plate insertion slot 47 in the y-axis direction. The central portion 12 of the shield plate 10 is inserted into the shield plate insertion slot 47 so that the slit 11 in the shield plate 10 engages the shield plate insertion rib 46. By inserting the central portion 12 of the shield plate 10 deep into the shield plate insertion slot 47, rattling can be suppressed between the shield plate 10 and the clip 30 in the y-axis direction (vertical direction of the vehicle).

The following is an explanation of the various components used to mount the clip 30 to the body panel 20. As shown from the front in FIG. 6, the lower portion of the clip 30 has a pair of leg portions 28 inserted into the welding holes 21, 22 in the body panel 20. The leg portions 28 have a conical shape overall that is split in half to the outside surface 31.

At the opposite end of the outside surface 31 in the leg portions 28 are conical portions 33 whose radius centered on the welding holes 21, 22 increases moving upward in the z-axis direction. In the portion between the two conical portions 33, the interval becomes narrower moving upward in the z-axis direction. When the clip 30 is mounted on the body panel 20, the conical portions 33 make contact with the inner periphery of the welding holes 21, 22, so the clip 30 can be guided in the x-axis direction and the y-axis direction and mounted in the proper position.

As shown in FIG. 7a, which is a cross-sectional view along line A-A in FIG. 5, the central portions at the ends of the leg portions 28 opposite the outside surface 31 have multi-step engagement prongs 34 cut into the conical portions 33. The multi-step engagement prongs 34 interpose and secure from both sides the portion 23 between the two welding holes 21, 22 in the body panel 20. Because the multi-step engagement prongs 34 have multiple tiers, the clip 30 can be fixed to the portion between the holes 23 in a body panel 30 even when the dimensions and the plate thickness of the portion between the holes 23 in the body panel 20 change. FIG. 7b is an enlarged cross-sectional view of a portion of the multi-step engagement prong 34 in the portion indicated by C in FIG. 7a.

In FIG. 7a, the end portion of a multi-step engagement prong 34 in the clip 30 has a clip releasing piece 35. The portion 23 between the two welding holes 21, 22 in the body panel 20 is interposed and fixed by the multi-step engagement prongs 34 from both sides. However, when the clip releasing piece 35 is pushed open manually, the multi-step engagement prongs 34 are disengaged from the portion 23 so the clip 30 can be released.

As shown in perspective view in FIG. 4 and from the front in FIG. 6, protruding corner-filling ribs 36 are formed in the base portions of the leg portions 28 of the clip 30 at four locations on each leg 28. Two of the corner-filling ribs 36 are adjacent to the outside surface 31, and the other two corner-filling ribs 36 are adjacent to the multi-step engagement prongs 34. When the leg portions 28 of the clip 30 are guided into the welding holes 21, 22 by the conical portions 33, the corner-filling ribs 36 on the base portion of one leg portion 28 engage the inner periphery of one of the welding holes 21, and the corner-filling ribs 36 on the base portion of the other leg portion 28 engage the inner periphery of the other welding hole 22. This keeps the clip 30 from coming out.

As shown in perspective view in FIG. 4 and as shown in FIG. 8, which is a cross-sectional view along line B-B in FIG. 5, a rattle-preventing elastic piece 37 extending in the y-axis direction from the outside surface 32 is formed in the lower central portion of the outside surface 32 of the clip 30. The end portion of the rattle-preventing elastic piece 37 curves in the z-axis direction away from the base portion. When the clip 30 is mounted on the body panel 20, the end portion of the rattle-preventing elastic piece 37 pushes against the surface of the body panel 20 and bends. This restrains the movement of the clip 30 in the y-axis direction (the vertical direction of the vehicle).

When a clip 30 has been mounted in a vehicle for a long period of time, the end portion of the rattle-preventing elastic piece 37 experiences creep deformation, and the force applied to the body panel 20 weakens.

A rattle-preventing rigid rib 38 is formed around the rattle-preventing elastic piece 37 so as to surround the rattle-preventing elastic piece 37 on three sides. The rattle-preventing rigid rib 38 has a height that is greater than the rattle-preventing elastic piece 37 in the z axis direction, and this shape makes it difficult for creep deformation to occur. Even after the rattle-preventing elastic piece 37 has experienced creep deformation, it acts to minimize rattling of the clip 30.

Figure 9:
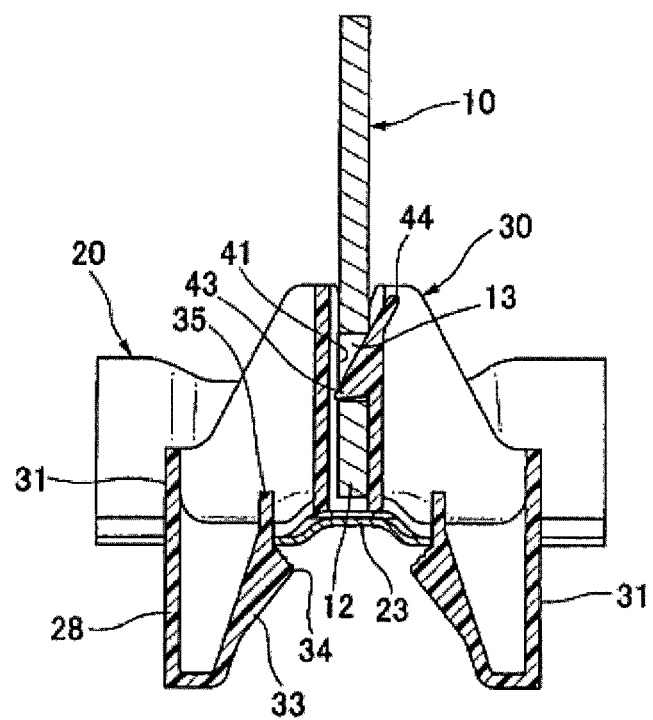
FIG. 9 is a cross-sectional view taken along line A-A in FIG. 5 showing the shield plate mounted on the body panel using the clip shown in FIG. 4.

FIG. 9 is a cross-sectional view along line A-A in FIG. 5 showing a shield plate 10 mounted on a body panel 20 using the clip 30. The central portion 12 of the shield plate 10 is inserted into the shield plate insertion slot 47, and a shield plate engagement prong 43 enters an engagement hole 13. The slit 11 in the shield plate 10 engages the insertion rib 46, and the central portion 12 of the shield plate 10 near the slit 11 makes contact with the shield plate rattle-suppressing rib 45. In this way, the shield plate 10 is fixed to the clip 30.

The conical portions 33 of the two leg portions 28 of the clip 30 make contact with the inner periphery of the welding holes 21, 22. The end portion of the rattle-preventing elastic piece 37 presses against a surface of the body panel 20, and the rattle-preventing rigid rib 38 makes contact with the surface of the body panel 20. The multi-step engagement prongs 34 in the clip 30 interpose the portion 23 between the two welding holes 21, 22 in the body panel 20 from both sides, and the clip 30 is fixed to the body panel 20.

In the embodiment of the present invention, the clip 30 for mounting a shield plate 10 can be mounted using existing welding holes.

The same clip 30 can be used to mount left and right shield plates 10 on the inside of the body panel 20, and the same clip 30 can be adapted for use on different vehicle models.

Also, when a shield plate 10 is mounted on a body panel 20 using the clip 30, rattling is reduced in every direction.

When the shield plate releasing piece 44 is opened after the clip 30 has been mounted on a vehicle, the shield plate 10 can be released from the clip 30 by itself. Also, when the clip releasing piece 35 is pushed and opened, the clip 30 can be easily released with or without the shield plate 10.

Those skilled in the art will appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. A clip for fastening a fender shield plate used to mount a fender shield plate on a body panel, wherein the clip comprises a shield plate insertion slot for inserting the shield plate, and a pair of leg portions mountable in two mounting holes in a body panel, wherein a distance between the pair of leg portions becomes smaller as a base portion of the leg portions is approached, and wherein each one of the leg portions is insertable into and mounted in one of the mounting holes in the body panel, and further wherein the clip has a shield plate engagement prong for engaging an engagement hole in the fender shield plate, and a shield plate releasing piece for disengaging the shield plate engagement prong, thereby disengaging the shield plate engagement prong, and releasing the fender shield plate.

2. A clip for fastening a fender shield plate used to mount a fender shield plate on a body panel, wherein the clip comprises a shield plate insertion slot for inserting the shield plate, and a pair of leg portions mountable in two mounting holes in a body panel, wherein a distance between the pair of leg portions becomes smaller as a base portion of the leg portions is approached, and wherein each one of the leg portions is insertable into and mountable in one of the mounting holes in the body panel, and further wherein both ends of the shield plate mounting surface on the side with the shield plate insertion slot have raised shield plate rattle-suppressing ribs.

3. The clip for fastening a fender shield plate according to claim 1, wherein the fender shield plate has two slits, and wherein both ends of the shield plate insertion slot have shield plate insertion ribs able to be inserted into the slits in the fender shield plate.

4. The clip for fastening a fender shield plate according to claim 1, wherein the leg portions have two multi-step engagement prongs for engaging the inner periphery of the two mounting holes in the body panel, and two clip releasing pieces adjacent to the multi-step engagement prongs for releasing the prongs from the body panel, thereby disengaging the multi-step engagement prongs from the mounting holes in the body panel, and releasing the clip for fastening a fender shield plate.

5. The clip for fastening a fender shield plate according to claim 1, wherein the base portions of the leg portions have a protruding corner-filling rib, and wherein the corner-filling ribs engage the inner periphery of the mounting holes when the leg portions are inserted into the mounting holes in the body panel.

6. A clip for fastening a fender shield plate used to mount a fender shield plate on a body panel, wherein the clip comprises a shield plate insertion slot for inserting the shield plate, and a pair of leg portions mountable in two mounting holes in a body panel, wherein a distance between the pair of leg portions becomes smaller as a base portion of the leg portions is approached, and wherein each one of the leg portions is insertable into and mountable in one of the mounting holes in the body panel, and further wherein the clip has a rattle-preventing elastic piece, and wherein the end portion thereof curves downward from the base portion so as to press against a surface of the body panel.

7. The clip for fastening a fender shield plate according to claim 6, wherein the clip has a rattle-preventing rigid rib surrounding the rattle-preventing elastic piece.

* * * * *